United States Patent
Yoshida

(10) Patent No.: US 8,733,822 B2
(45) Date of Patent: May 27, 2014

(54) VEHICLE FRONT STRUCTURE

(75) Inventor: Koji Yoshida, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/121,256

(22) PCT Filed: Sep. 2, 2009

(86) PCT No.: PCT/JP2009/065329
§ 371 (c)(1),
(2), (4) Date: Mar. 28, 2011

(87) PCT Pub. No.: WO2011/027431
PCT Pub. Date: Mar. 10, 2011

(65) Prior Publication Data
US 2011/0175400 A1  Jul. 21, 2011

(51) Int. Cl.
*B62D 25/20* (2006.01)
*B62D 25/14* (2006.01)

(52) U.S. Cl.
USPC ............. 296/187.08; 296/193.07; 296/70

(58) Field of Classification Search
USPC ........ 296/187.08, 70, 74, 75, 193.07, 203.02, 296/204, 193.09, 187.09
See application file for complete search history.

(56) References Cited

U.S. PATENT DOCUMENTS

| 7,832,795 | B2 * | 11/2010 | Yokoi et al. | 296/204 |
| 7,896,421 | B2 * | 3/2011 | Kosuge et al. | 296/75 |
| 2001/0028179 | A1 * | 10/2001 | Takemoto et al. | 296/204 |

FOREIGN PATENT DOCUMENTS

| CN | 101164819 A | 4/2008 |
| JP | 1 132474 | 5/1989 |
| JP | 8 133132 | 5/1996 |
| JP | 2004 306891 | 11/2004 |
| JP | 2005 162144 | 6/2005 |
| JP | 2006-151037 A | 6/2006 |

OTHER PUBLICATIONS

International Preliminary Report on Patentability issued Mar. 29, 2012, in International application No. PCT/JP2009/065329 (English translation) (International filing date Sep. 2, 2009).
Office Action issued Jul. 3, 2012, in Japanese Patent Application No. 2011-502175.
International Search Report issued Nov. 24, 2009 in PCT/JP09/65329 filed Sep. 2, 2009.

* cited by examiner

*Primary Examiner* — Glenn Dayoan
*Assistant Examiner* — Melissa A Black
(74) *Attorney, Agent, or Firm* — Oblon, Spivak, McClelland, Maier & Neustadt, L.L.P.

(57) ABSTRACT

A vehicle front structure includes a dash panel that is located at a front portion of a vehicle and a floor panel that extends in a longitudinal direction of the vehicle. The dash panel includes a contact portion which extends in the vehicle width direction and with which a front end portion of the floor panel comes into contact, and concave portions that are located below the floor panel and opened upward in a side view of the vehicle body. The contact portion is formed integrally with the concave portions. Accordingly, the vehicle front structure may be easily worked and joining among a dash panel, a floor panel, and an inner panel in the related art may be changed to joining between two parts, that is, the dash panel and the floor panel, so that it may be possible to strengthen the joints between the dash panel and the floor panel.

11 Claims, 5 Drawing Sheets

VEHICLE FRONT STRUCTURE

TECHNICAL FIELD

The present invention relates to a vehicle front structure that includes a dash panel and a floor panel.

BACKGROUND ART

In the past, a vehicle front structure where a lower end of a dash panel is joined to a floor panel and an inner torque is formed on the lower surface of the floor panel has been known as a vehicle front structure as disclosed in Japanese Unexamined Patent Application Publication No. 2005-162144.

CITATION LIST

Patent Literature

[Patent Literature 1] Japanese Unexamined Patent Application Publication No. 2005-162144.

SUMMARY OF INVENTION

Technical Problem

However, since the above-mentioned structure in the related art includes three parts, that is, the dash panel, the floor panel, and the inner torque, workability is poor and joint surfaces need to be further strengthened when the parts are joined.

The invention has been made to solve the technical problem, and an object of the invention is to provide a vehicle front structure that can be easily worked and strengthen joints.

Solution to Problem

A vehicle front structure according to the invention includes a dash panel that is located at a front portion of a vehicle and a floor panel that extends in a longitudinal direction of the vehicle. The dash panel includes a contact portion which extends in a vehicle width direction and with which a front end portion of the floor panel comes into contact, and concave portions that are located below the floor panel and opened upward in a side view of the vehicle body. The contact portion is formed integrally with the concave portions.

In the vehicle front structure according to the invention, the concave portions, which are located below the floor panel and opened upward in the side view of the vehicle body, serve as inner torques and reinforce the floor panel. In addition, since the concave portions are formed integrally with the contact portion, working is easily performed and it may be possible to reduce the number of parts. Accordingly, the joining among a dash panel, a floor panel, and an inner panel in the related art may be changed to the joining between the two parts, that is, the dash panel and the floor panel, so that an increase in the strength of the joints may be achieved.

In the vehicle front structure according to the invention, it is preferable that the concave portions be joined to the lower surface of the floor panel. According to this, it may be possible to form a reinforcing frame having a rectangular cross-section so that the concave portions are covered with the floor panel.

In the vehicle front structure according to the invention, it is preferable that the concave portions be further formed at portions corresponding to the lower surface of a tunnel part and the concave portions be joined to the lower surface of the floor panel so as to form a cross member. According to this, it may be possible to increase the strength of the floor panel.

Advantageous Effects of Invention

According to the invention, it may be possible to provide a vehicle front structure that can be easily worked and strengthen a joint.

DESCRIPTION OF EMBODIMENTS

Figure 1:
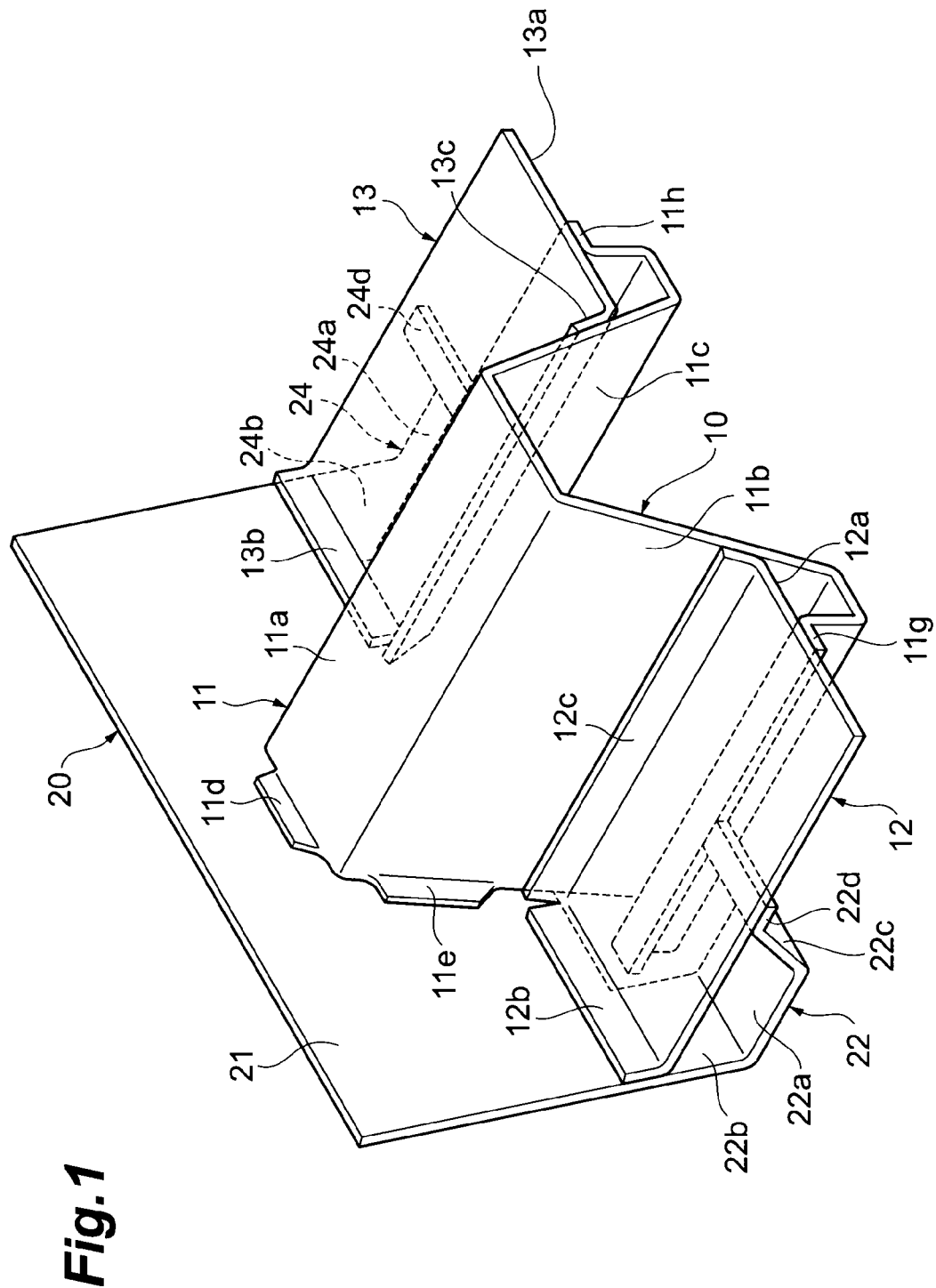
FIG. 1 is a perspective view of a vehicle front structure according to a first embodiment.

Embodiments of the invention will be described in detail below with reference to the accompanying drawings. Meanwhile, the same elements in the description of the drawings are denoted by the same reference numerals, and repeated description thereof will be omitted.

First Embodiment

Figure 2:
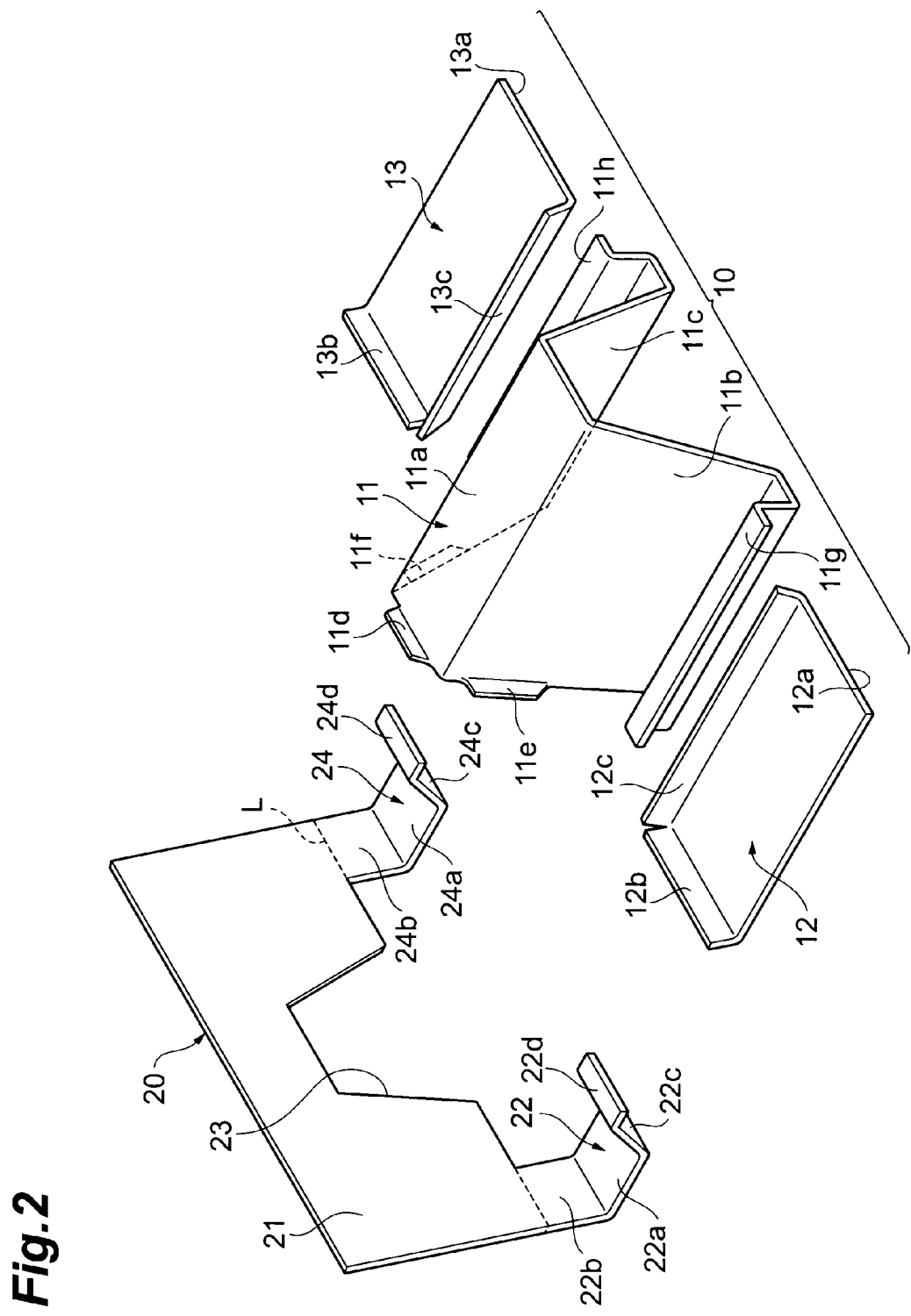
FIG. 2 is an exploded perspective view of the vehicle front structure according to the first embodiment.

FIG. 1 is a perspective view of a vehicle front structure according to a first embodiment, and FIG. 2 is an exploded perspective view of the vehicle front structure according to the first embodiment. The vehicle front structure according to this embodiment includes a floor panel 10 that extends in the longitudinal direction of the vehicle and a dash panel 20 that is located in front of the floor panel 10.

The floor panel 10 forms the floor of the vehicle cabin. The floor panel 10 includes a tunnel part 11 that is located in the middle and extends in the longitudinal direction of the vehicle, and floor parts 12 and 13 that are located on both the right and left sides of the tunnel part 11. The tunnel part 11 is formed in a convex shape so as to protrude toward the upper side of the vehicle. The tunnel part 11 includes a flat plate-like top portion 11a and a pair of side portions 11b and 11c that extends downward from both the right and left ends of the top portion 11a.

The front end portion of the tunnel part 11 comes into contact with the dash panel 20, and is joined to the dash panel 20 by welding or the like. For this purpose, joining portions 11d, 11e, and 11f, which are joined to the dash panel 20, are formed at the front end portion of the tunnel part 11. These joining portions 11d, 11e, and 11f are formed parallel to the dash panel 20 so as to come into surface contact with the dash panel 20. Further, when the tunnel part 11 and the dash panel 20 are to be joined to each other, the joining portions 11d, 11e, and 11f are superimposed on the dash panel 20 and the tunnel part 11 and the dash panel 20 are joined to each other by spot welding.

Further, joining portions 11g and 11h, which are joined to the floor parts 12 and 13, are formed at both the side portions 11b and 11c of the tunnel part 11, respectively. These joining portions 11g and 11h are formed parallel to the floor parts 12 and 13 so as to come into surface contact with lower surfaces 12a and 13a of the floor parts 12 and 13, and extend in the longitudinal direction of the vehicle.

The floor parts 12 and 13 extend in the longitudinal direction of the vehicle and are formed substantially in the shape of a flat plate. Joining portions 12b and 13b, which are joined to the dash panel 20, are formed at the front end portions of the floor parts 12 and 13, respectively. These joining portions 12b and 13b are formed parallel to the dash panel 20 so as to come into surface contact with the dash panel 20, and extend in the vehicle width direction. Further, joining portions 12c and 13c, which are joined to the side portions 11b and 11c, are formed at the end portions of the floor parts 12 and 13, which are adjacent to the tunnel part 11, respectively. These joining portions 12c and 13c are formed parallel to the side portions 11b and 11c so as to come into surface contact with the side portions 11b and 11c, and extend in the longitudinal direction of the vehicle.

The dash panel 20 is located at the front portion of the vehicle, and divides the vehicle cabin from the engine room of the vehicle (not shown). As shown in FIG. 2, a cutout 23 corresponding to the shape of the tunnel part 11 is formed at the position on the dash panel 20 that corresponds to the tunnel part 11. The dash panel 20 includes a contact portion 21 with which the front end portion of the floor panel 10 comes into contact, and concave portions 22 and 24 that are located below the floor panel 10 and opened upward in the side view of the vehicle body.

The contact portion 21 is formed substantially in the shape of a flat plate, extends in the vehicle width direction, and is inclined from the front side to the rear side at a predetermined angle. The concave portions 22 and 24 are formed integrally with the contact portion 21, and are located so as to be symmetric with respect to the tunnel part 11. As shown in FIG. 2, the concave portions 22 and 24 include flat bottoms 22a and 24a, and side portions 22b, 22c, 24b, and 24c that extend upward from both front and rear ends of the bottoms 22a and 24a, respectively.

The side portions 22b and 24b are connected to the contact portion 21. Joining portions 22d and 24d, which are joined to the floor parts 12 and 13, are formed at the end portions of the side portions 22c and 24c, respectively. These joining portions 22d and 24d are formed parallel to the floor parts 12 and 13 so as to come into surface contact with the lower surfaces 12a and 13a of the floor parts 12 and 13. The dash panel 20 having the above-mentioned configuration is formed by cutting out, for example, one metal plate and then bending the metal plate in a predetermined shape. In this case, it may be possible to easily shape the dash panel 20.

In the vehicle front structure having the above-mentioned configuration, concave portions 22 and 24, which are located below the floor panel 10 and opened upward in the side view of the vehicle body, serve as inner torques and reinforce the floor panel 10. In addition, since the concave portions 22 and 24 are formed integrally with the contact portion 21, working is easily performed and it may be possible to reduce the number of parts. Accordingly, the joining among a dash panel, a floor panel, and an inner panel in the related art may be changed to the joining between the two parts, that is, the dash panel 20 and the floor panel 10, so that it may be possible to strengthen the joints between the dash panel 20 and the floor panel 10.

Further, since the concave portions 22 and 24 are joined to the lower surfaces 12a and 13a of the floor parts 12 and 13, it may be possible to form a reinforcing frame having a rectangular cross-section so that the concave portions 22 and 24 are covered with the floor parts 12 and 13. That is, a closed cross-sectional structure is formed by the concave portions 22 and 24 and the floor parts 12 and 13 (see FIG. 1). Furthermore, in this embodiment, it may be possible to form each of the concave portions 22 and 24 with the same thickness as an inner torque in the related art by making the thickness be different at a broken line L shown in FIG. 2. Accordingly, it may be possible to maintain the same strength as the strength of a structure including the inner torques in the related art.

Second Embodiment

Figure 3:
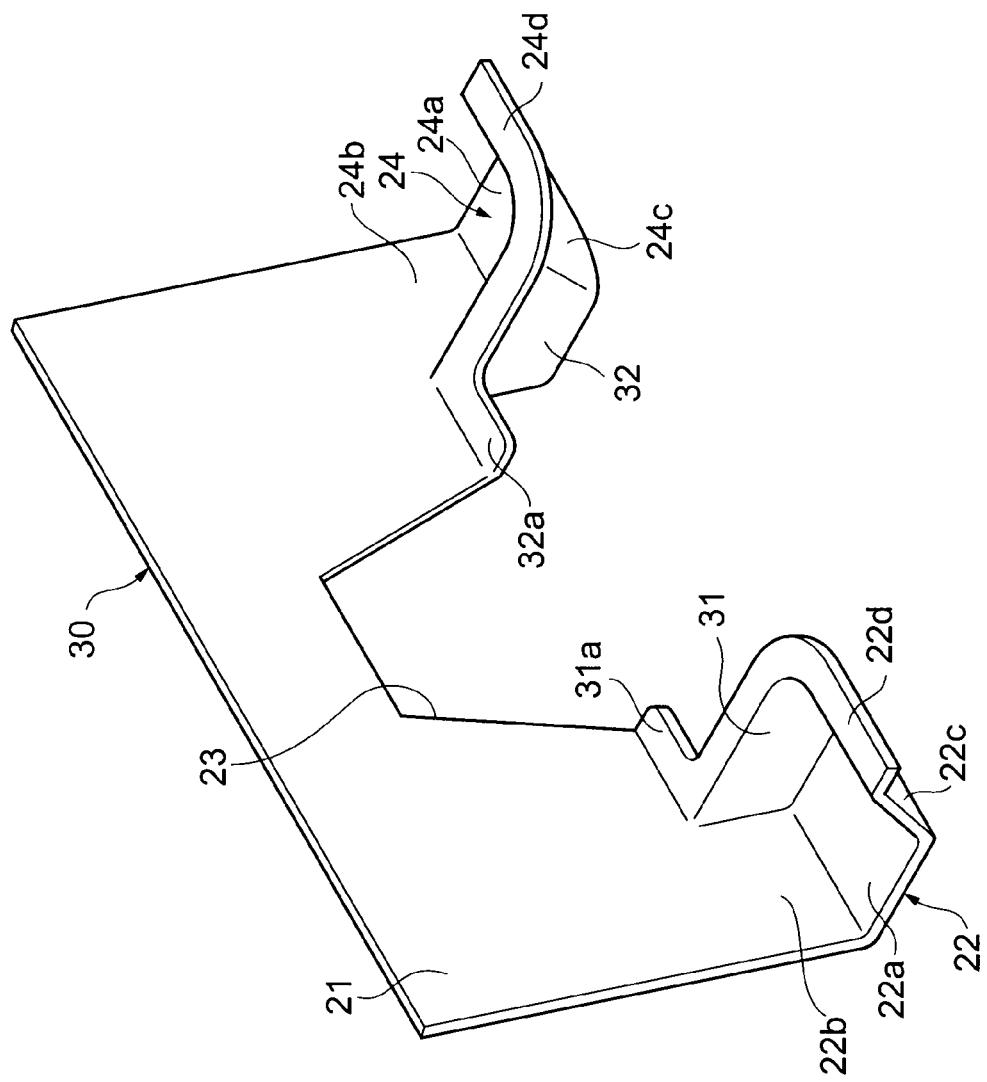
FIG. 3 is a perspective view of a dash panel of a vehicle front structure according to a second embodiment.

FIG. 3 is a perspective view of a dash panel of a vehicle front structure according to a second embodiment. Since the shape of the dash panel 30 of the vehicle front structure according to a second embodiment is different from that of the dash panel 20 of the first embodiment and the configuration of the vehicle front structure is otherwise the same as that of the first embodiment, repeated description of the other configuration thereof will be omitted.

As shown in FIG. 3, a side wall 31 is erected on the right side (the side adjacent to the tunnel part 11) of the concave portion 22 so as to close the right end of the concave portion 22. Both ends of the side wall 31 in the longitudinal direction are connected to the side portions 22b and 22c of the concave portion 22, respectively. Further, a joining portion 31a, which extends to be flush with the joining portion 22d of the concave portion 22, is formed at the upper portion of the side wall 31. One end of the joining portion 31a is connected to the joining portion 22d of the concave portion 22, and the other end thereof extends up to the cutout 23.

Meanwhile, a side wall 32 is formed at the concave portion 24 at a position symmetric to the side wall 31. The side wall 32 is erected on the left side (the side adjacent to the tunnel part 11) of the concave portion 24. Both ends of the side wall 32 in the longitudinal direction are connected to the side portions 24b and 24c of the concave portion 24, respectively. A joining portion 32a, which extends to be flush with the joining portion 24d of the concave portion 24, is formed at the upper portion of the side wall 32. One end of the joining portion 32a is connected to the joining portion 24d of the concave portion 24, and the other end thereof extends up to the cutout 23.

The dash panel 30 having the above-mentioned configuration is formed by cutting out, for example, one metal plate and then drawing the metal plate in a predetermined shape. That is, the joining portions 31a and 32a are formed, so that the joint strength between the floor parts 12 and 13 and the dash panel 30 may be increased. Accordingly, it may be possible to increase the reinforcing strength of the floor panel 10. The vehicle front structure according to this embodiment has the same effect as the effect of the first embodiment.

Third Embodiment

Figure 4:
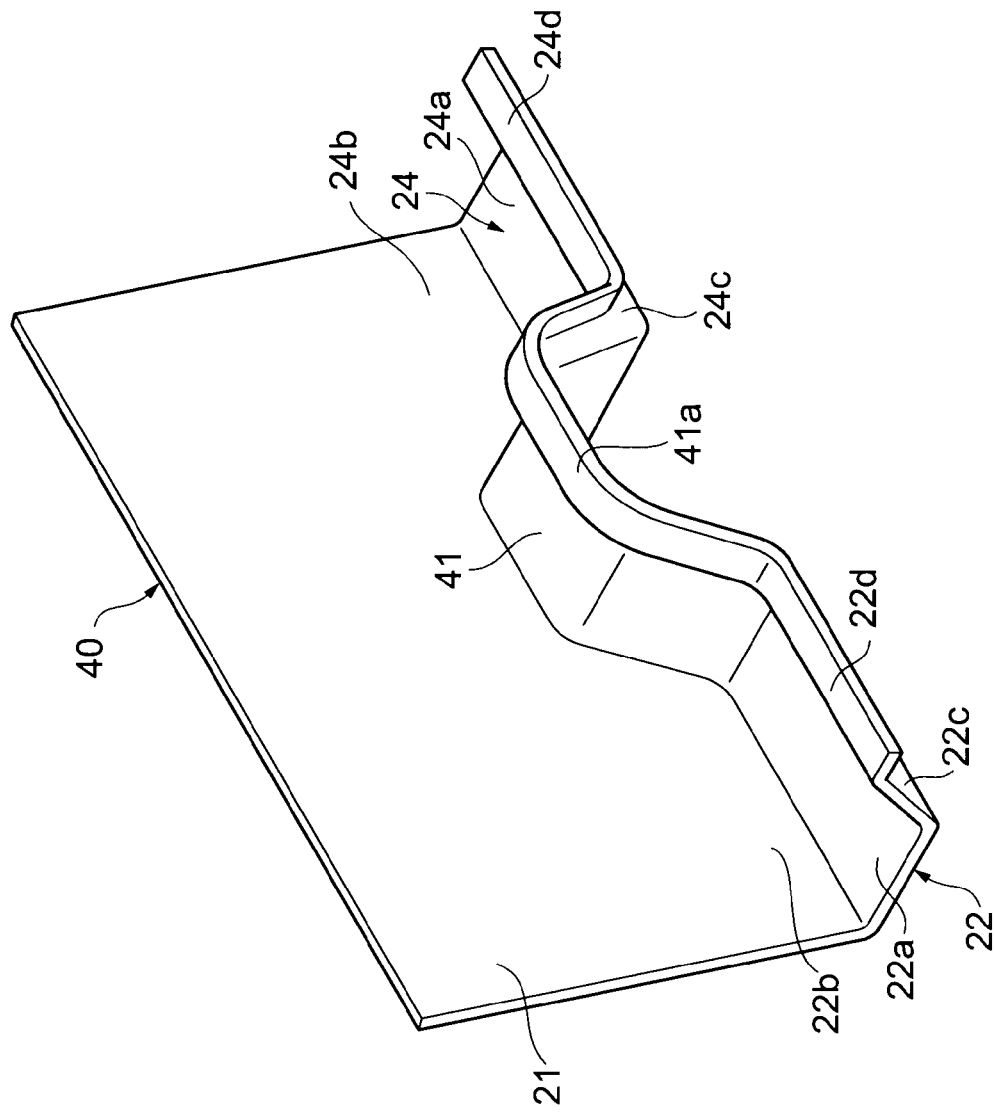
FIG. 4 is a perspective view of a dash panel of a vehicle front structure according to a third embodiment.

FIG. 4 is a perspective view of a dash panel of a vehicle front structure according to a third embodiment. Since the shape of a dash panel 40 of the vehicle front structure according to a third embodiment is different from that of the dash panel 20 of the first embodiment and other configuration of the vehicle front structure is the same as that of the first embodiment, the repeated description of the other configuration thereof will be omitted.

As shown in FIG. 4, a tunnel concave portion 41 corresponding to the shape of the tunnel part 11 is formed substantially in the middle of the dash panel 40 at a position corresponding to the tunnel part 11 of the floor panel 10. The tunnel concave portion 41 is formed in a convex shape so as to protrude toward the upper side of the vehicle, and both left and right ends of the tunnel concave portion are connected to the concave portions 22 and 24, respectively. Further, a joining portion 41a, which is joined to the tunnel part 11 of the floor panel 10, is formed at the tunnel concave portion 41. Both left and right ends of the joining portion 41a are connected to the joining portions 22d and 24d of the concave portions 22 and 24, respectively. That is, the concave portions 22 and 24, the tunnel concave portion 41, and the floor panel 10 are joined to each other, so that a cross member is formed in the width direction of the floor panel 10. Accordingly, it may be possible to further increase the strength of the floor panel 10. Meanwhile, the vehicle front structure according to this embodiment has the same effect as the effect of the first embodiment.

Fourth Embodiment

Figure 5:
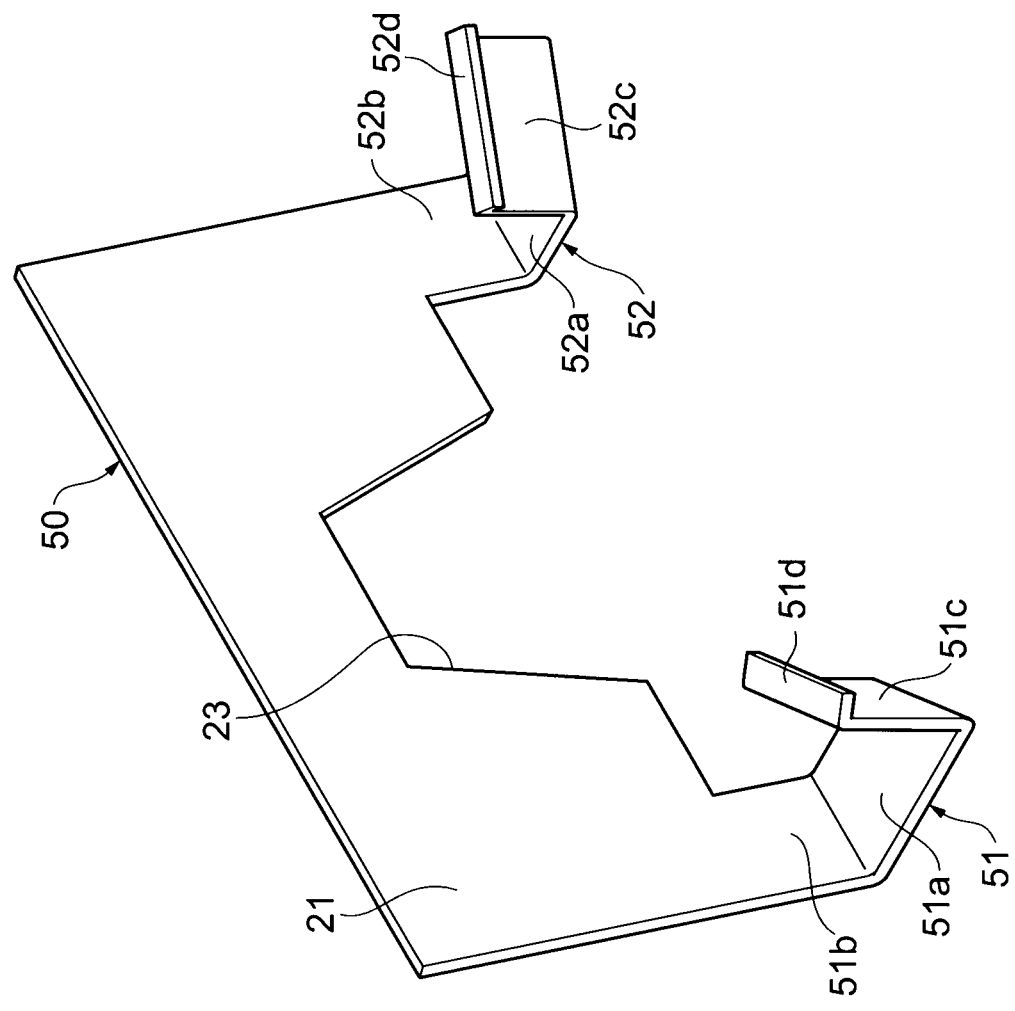
FIG. 5 is a perspective view of a dash panel of a vehicle front structure according to a fourth embodiment.

FIG. 5 is a perspective view of a dash panel of a vehicle front structure according to a fourth embodiment. Since the shape of a dash panel 50 of the vehicle front structure according to a first embodiment is different from that of the dash panel 20 of the first embodiment and the configuration of the vehicle front structure is otherwise the same as that of the first embodiment, the repeated description of the other configuration thereof will be omitted.

As shown in FIG. 5, concave portions 51 and 52 are formed integrally with the contact portion 21 and located so as to be symmetric with respect to the tunnel part 11. The concave portions 51 and 52 includes flat bottoms 51a and 52a, and side portions 51b, 51c, 52b, and 52c that extend upward from front and rear ends of the bottoms 51a and 52a, respectively. Further, the respective side portions 51b and 52b are connected to the contact portion 21. Meanwhile, side portions 51c and 52c, which are located on the rear side, are inclined so that a gap therebetween is increased from the inside toward the outside.

Furthermore, joining portions 51d and 52d, which are joined to the floor parts 12 and 13, are formed at the end portions of the side portions 51c and 52c, respectively. These joining portions 51d and 52d are formed parallel to the floor parts 12 and 13 so as to come into surface contact with the lower surfaces 12a and 13a of the floor parts 12 and 13. The dash panel 50 having the above-mentioned configuration is formed by cutting out, for example, one metal plate and then bending the metal plate in a predetermined shape. In this case, it may be possible to easily shape the dash panel 50. That is, since an outer gap of the inner torque to be formed is large, strength against an impact load transmitted to a vehicle side part such as a side member is secured. Accordingly, a load transmitted to the middle portion of the vehicle is transmitted to the side portions 51c and 52c and can be distributed toward the vehicle side parts such as side members. Meanwhile, the vehicle front structure according to this embodiment has the same effect as the effect of the first embodiment.

Each of the above-mentioned embodiments shows an example of the vehicle front structure according to the invention. The vehicle front structure according to the invention is not limited to the description of the above-mentioned embodiments. The vehicle front structure according to the invention may be obtained by modifying the vehicle front structure according to the embodiments without changing the scope described in each claim, or by applying the invention to other structures.

REFERENCE SIGNS LIST

10: floor panel
12a, 13a: lower surface
20, 30, 40, 50: dash panel
21: contact portion
22, 24, 51, 52: concave portion

The invention claimed is:

1. A vehicle front structure comprising:
a dash panel located at a front portion of a vehicle; and
a floor panel extending in a longitudinal direction of the vehicle,
wherein the dash panel includes:
a contact portion which extends in a vehicle width direction and with which a front end portion of the floor panel comes into contact, and
concave portions that are located below the floor panel and opened upward in a side view of a vehicle body, each of the concave portions including a bottom portion, a first side portion extending upward from a front end of the bottom portion, and a second side portion extending upward from a rear end of the bottom portion,
wherein the contact portion is formed integrally with the concave portions,
wherein the floor panel comprises a tunnel part and first and second floor parts which are located on right and left sides of the tunnel part and are formed out of one flat plate, the tunnel part including a flat top portion and a pair of side portions extending downward from right and left ends of the top portion,
wherein each of the floor parts includes a front joining portion formed at a front end portion of the floor part and a side joining portion formed at a side portion of the floor part, the front joining portion of the floor parts abutting the contact portion of the dash panel and the side joining portion of the floor parts abutting the side portions of the tunnel part,
wherein the first and second floor parts cooperate with the concave portions to form a closed cross-sectional structure, and
wherein the concave portions are further formed at portions corresponding to a lower surface of the tunnel part of the floor panel, and the concave portions are joined to a lower surface of the floor panel so as to form a cross member.

2. The vehicle front structure according to claim 1, wherein the concave portions are joined to a lower surface of the floor panel.

3. The vehicle front structure according to claim 1, wherein a joining portion, which is joined to the floor panel, is formed at an end portion of the second side portion.

4. The vehicle front structure according to claim 3, wherein the joining portion is parallel to the floor panel.

5. The vehicle front structure according to claim 1, wherein the bottom portion is flat.

6. The vehicle front structure according to claim 1, wherein the first side portion is connected to the contact portion.

7. The vehicle front structure according to claim 1, wherein each of the concave portions includes a side wall with a first end connected in the longitudinal direction to the first side portion and a second end connected in the longitudinal direction to the second side portion.

8. The vehicle front structure according to claim 7, wherein a joining portion is formed at an upper portion of the side wall.

9. The vehicle front structure according to claim 1, wherein the closed cross-sectional structure has a rectangular cross-section.

10. The vehicle front structure according to claim 1, wherein joining portions of the tunnel part are formed at front end portions of the top portion and the side portions of the tunnel part, the joining portions of the tunnel part abutting the contact portion of the dash panel.

11. The vehicle front structure according to claim 1, wherein floor part joining portions are formed at each end of the side portions of the tunnel part and are parallel with the floor parts, each of the floor part joining portions abutting the respective floor part.

* * * * *